United States Patent
Guo et al.

(10) Patent No.: US 7,532,883 B2
(45) Date of Patent: May 12, 2009

(54) WIRELESS COMMUNICATION APPARATUS WHICH COMMUNICATES AT SPECIFIED FRAME CYCLES

(75) Inventors: Li Guo, Irving, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 11/656,624

(22) Filed: Jan. 23, 2007

(65) Prior Publication Data

US 2008/0037503 A1 Feb. 14, 2008

Related U.S. Application Data

(60) Provisional application No. 60/836,719, filed on Aug. 10, 2006.

(51) Int. Cl.
*H04W 4/00* (2009.01)
*H04B 1/38* (2006.01)

(52) U.S. Cl. .................. 455/422.1; 455/561
(58) Field of Classification Search .......... 455/422.1, 455/561; 370/342
See application file for complete search history.

(56) References Cited

U.S. PATENT DOCUMENTS

| | | | |
|---|---|---|---|
| 2008/0037503 A1* | 2/2008 | Guo et al. | 370/342 |
| 2008/0039067 A1* | 2/2008 | Jin et al. | 455/422.1 |
| 2008/0051145 A1* | 2/2008 | Jin | 455/561 |

* cited by examiner

*Primary Examiner*—William D Cumming

(57) ABSTRACT

A method is provided for selecting multiple customer premises equipments (CPEs) to share a channel in a wireless communications network. The method includes calculating a correlation between spatial signatures of every two CPEs subscribing to a base transceiver station (BTS) of the wireless communications network, wherein two CPEs constitute channel-sharing candidates if their correlation is lower than a predetermined threshold, creating a first set of CPEs of all the member of channel-sharing candidates, counting a number of channel-sharing candidates a CPE relates to for every CPE, selecting a first CPE related to the fewest number of channel-sharing candidates, creating a second set of CPEs by identifying all the CPEs that the first CPE relates to, and selecting a second CPE related to the fewest number of channel-sharing candidates from the second set of CPEs, wherein the first and second CPEs become two selected CPEs to share the channel.

19 Claims, 3 Drawing Sheets

WIRELESS COMMUNICATION APPARATUS WHICH COMMUNICATES AT SPECIFIED FRAME CYCLES

CROSS REFERENCE

The present application claims the benefit of U.S. Provisional Application Ser. 60/836,719, which was filed on Aug. 10, 2006.

BACKGROUND

Spatial division multiple access (SDMA) increases the capacity of a wireless communications network by allowing more than one wireless station to access a communication channel on the same frequency at the same time. One example of channel sharing is that wireless stations, such as customer premises equipments (CPEs), transmit signals on the same frequency at different times or on different frequencies at the same time.

How to select a set of CPEs to share a communication channel is a very complicated and computationally intensive process. This is true primarily because not every CPE can share a communication channel with other CPEs in a wireless communications network employing SDMA.

There are a number of reasons why some CPEs cannot share a communication channel. One of the reasons is co-channel interference (CCI), which occurs when a CPE receives unintended signals from other CPEs sharing the same communication channel. This type of inter-user interference is the major drawback of an SDMA system. To suppress inter-user interference, an SDMA system must provide a means to isolate the spatial signatures of one CPE from those of the rest of the CPEs sharing a channel. Otherwise, inter-user interference may cause a communication channel to be unusable for the entire set of CPEs.

A second reason is that different CPEs may subscribe to the services of a base transceiver station (BTS) at any given time. In other words, a set of CPEs sharing a communication channel at one point in time may not be the same set of CPEs sharing the same communication channel at another time. A third reason is that the characteristics of the radio link may change over time.

In a conventional method, a BTS selects an optimal set of CPEs to permanently share a communication channel in a wireless communications network employing SDMA, based on certain predetermined parameters. The optimal set of CPEs chosen to share a communication channel at one time might not be optimal at a later time. Therefore, the permanent grouping of CPEs to share a communication channel is ineffective and inefficient.

What is desired is a system and method for improving the grouping of CPEs dynamically in a wireless communications network employing SDMA that addresses the dynamic nature of the radio link and participants of communication sessions.

SUMMARY

A method is provided for selecting multiple customer premises equipments (CPEs) to share a channel in a wireless communications network. The method comprises calculating a correlation between spatial signatures of every two CPEs subscribing to a base transceiver station (BTS) of the wireless communications network, wherein two CPEs constitute channel-sharing candidates if their correlation is lower than a predetermined threshold, creating a first set of CPEs of all the members of channel-sharing candidates, counting a number of channel-sharing candidates a CPE relates to for every CPE, selecting a first CPE related to the fewest number of channel-sharing candidates, creating a second set of CPEs by identifying all the CPEs that the first CPE relates to, and selecting a second CPE related to the fewest number of channel-sharing candidates from the second set of CPEs, wherein the first and second CPEs become two selected CPEs to share the channel.

The construction and method of operation of the techniques described herein, however, together with additional objects and advantages thereof, will be best understood from the following description of specific embodiments when read in connection with the accompanying drawings.

BRIEF DESCRIPTION OF THE DRAWING

The drawings accompanying and forming part of this specification are included to depict certain aspects of the techniques described herein. It should be noted that the features illustrated in the drawings are not necessarily drawn to scale.

DESCRIPTION

The following detailed description refers to the accompanying drawings. The description includes exemplary embodiments, not excluding other embodiments, and changes may be made to the embodiments described without departing from the spirit and scope of the subject matter described herein.

The method and system described herein reduces inter-user interference and improves the bit error rate (BER) for a group of CPEs in a wireless communications network employing SDMA. The selection of a group of CPEs to share a communication channel is based on the isolation of spatial signatures and path loss differences. The method and system described herein is applicable to any wireless communications network and the term channel refers to any of the conventional multiple access channels such as frequency, time, code or any combination of them. The method can be extended to include more than two CPEs, though the techniques described herein are directed to how to select two CPEs to share a communication channel.

Figure 1:
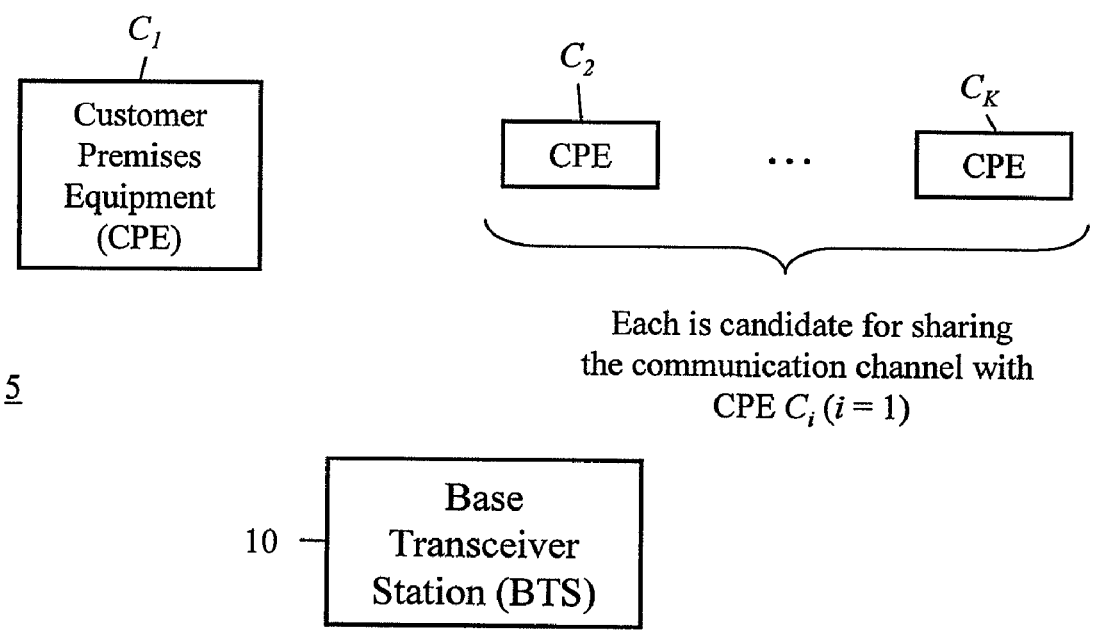
FIG. 1 is a block diagram of a wireless communication network and depicting channel sharing techniques among customer premises equipment that share a communication channel for services with a base transceiver station.

With reference to FIG. 1, a wireless communication network 5 is shown comprising a base transceiver station (BTS) 10 and multiple customer premises equipments (CPEs) $C_1$-$C_K$. The CPEs $C_1$-$C_K$ wirelessly communicate with the BTS 10. Assume that there are K CPEs that subscribe to the services of the BTS 10 in a cell of the wireless communications network 5 employing SDMA. By using the method described herein, the BTS 10 dynamically decides which CPEs would share a communication channel.

Figure 2:
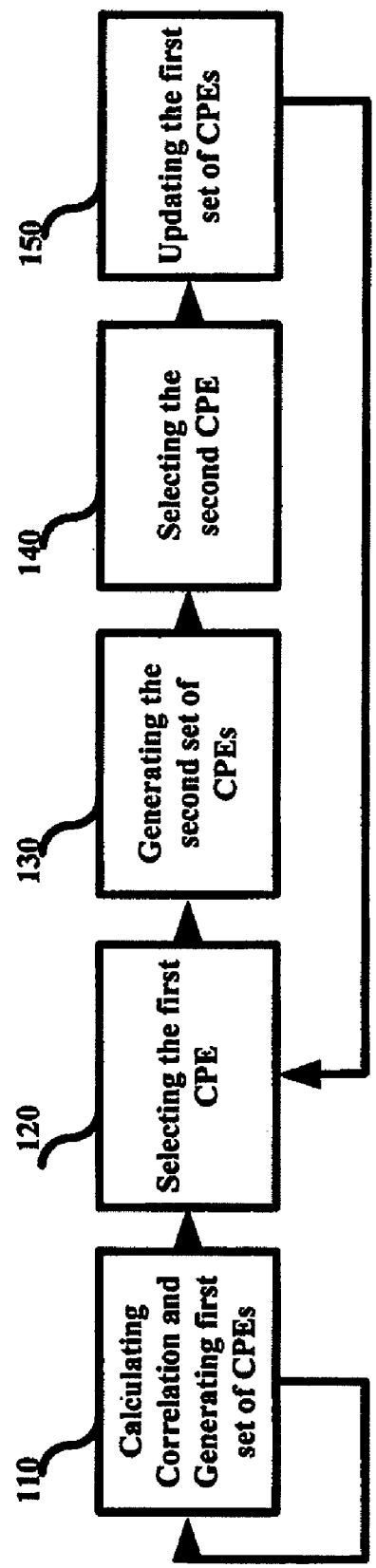
FIG. 2 is a flow diagram illustrating a method to have a channel shared by two customer premises equipments based on the isolation of spatial signatures.

FIG. 2 is a flow diagram illustrating a method to have a channel shared by two CPEs based on the isolation of spatial signatures.

Let $\{C_1, C_2, \ldots, C_K\}$ denote the set of K CPEs subscribing to the services of the BTS equipped with M antennas. Let the spatial signature of CPE $C_i$ be denoted as $$h_i = \begin{bmatrix} h_{i,1} \\ h_{i,2} \\ \vdots \\ h_{i,M} \end{bmatrix},$$

where $m \in (1,2,\ldots,M)$ and $h_{i,m}$ is a spatial signature associated with antenna m.

Each CPE $C_i$ is a candidate for sharing a communication channel with another CPE $C_j$. A partner set $\chi_{C_i}$, which includes all the CPEs that could share a communication channel with the CPE $C_i$, is created for each CPE $C_i$. The number of CPEs in the set $\chi_{C_i}$ is denoted as $n_{C_i}$. A number set, denoted as $\chi_{pre\_number} = \{n_{C_1}, n_{C_2}, \ldots, n_{C_k}\}$, is formed to show the number of partners of each CPE $C_i$.

In step 110, for each $C_j$, where $1 \leq j \leq K$ and $i \neq j$, the correlation $s_i^j$ between CPE $C_i$ and CPE $C_j$ is calculated according to the following equation:

$$s_i^j = |h_i^H h_j| = \left| \sum_{m=1}^{M} h_{i,m}^* h_{j,m} \right|. \quad (\ldots)^H$$

denotes a Hermitian operator. If $s_i^j < \gamma_0$, where $\gamma_0$ is a predetermined threshold and $0 \leq \gamma_0 \leq 1$, then $C_j$ is included in the partner set $\chi_{C_i}$ of CPE $C_i$.

The number of CPEs in the partner set of CPE $C_i$ is denoted as $n_{C_i}$. If $n_{C_i} > 0$, $C_i$ is included in a set $\chi_{pre}$, i.e., $\chi_{pre} = \chi_{pre} \cup \{C_i\}$ and $n_{C_i}$ is included in the $\chi_{pre\_number}$. The set $\chi_{pre}$ contains the CPEs that are pre-qualified to share a communication channel with another CPE. Step 110 is repeated for every CPE in the set $\{C_1, C_2, \ldots, C_K\}$.

In Step 120, the smallest element of $\chi_{pre\_number}$ is selected. If more than one $n_{C_i}$ has the same smallest value, a predetermined tie-breaker rule is employed to select only one $n_{C_i}$. For example, the first one of at least two CPEs that have the same smallest number in the $\chi_{pre\_number}$ is selected. In other words, CPE $C_i$ with the smallest number of partners is chosen to be one of the two CPEs selected to share a communication channel.

In step 130, let $\chi_{peer} = \chi_{C_i}$. For each CPE $C_j$ in the $\chi_{peer}$, the partner set of $C_i$, $n_{C_j}$ is included in the set $\chi_{peer\_number}$.

In step 140, the smallest element of $\chi_{peer\_number}$ is selected. If more than one $n_{C_j}$ has the same smallest value, a predetermined tie-breaker rule is employed to select only one $n_{C_j}$. In other words, CPE $C_j$ with the smallest number of partners, is chosen to be the other CPE that is to share a communication channel. A pair of CPEs ($C_i$, $C_j$) is identified to share a communication channel.

In Step 150, CPEs $C_i$ and $C_j$ are removed from the $\chi_{pre}$; $n_{C_i}$ and $n_{C_j}$ are removed from the $\chi_{peer\_number}$. If there is more than one element in $\chi_{pre}$, the pairing process repeats from step 120. The process continues until no more CPEs could share a communication channel. All feasible CPE pairs in SDMA are identified.

Figure 3:
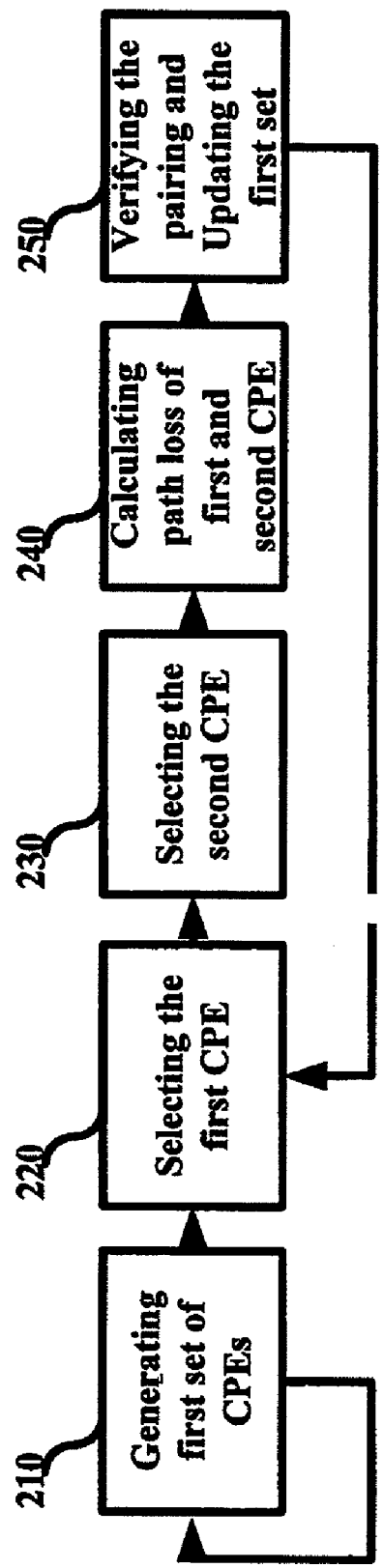
FIG. 3 is a flow diagram illustrating a second method to have a channel shared by two CPEs based on both the isolation of spatial signatures and path loss.

FIG. 3 illustrates a second method to have a channel shared by two CPEs based on the isolation of spatial signatures and path loss.

Let $\{C_1, C_2, \ldots, C_K\}$ denote the set of K CPEs subscribing to the services of the BTS equipped with M antennas. Let the spatial signature of CPE $C_i$ be denoted as $$h_i = \begin{bmatrix} h_{i,1} \\ h_{i,2} \\ \vdots \\ h_{i,M} \end{bmatrix},$$

where $m \in (1,2,\ldots,M)$ and $h_{i,m}$ is a spatial signature associated with antenna m. Let $\alpha_i$ denote the path loss of CPE $C_i$. Each CPE $C_i$ is a candidate for sharing a communication channel with another CPE $C_j$.

Two predetermined thresholds $\gamma_1$ and $\Delta\gamma$, where $0 \leq \gamma_1 \leq 1$ and $0 \leq \Delta\gamma \leq \gamma_1$, are chosen. The $\Delta\gamma$ is the marginal threshold of $\gamma_1$. A good guideline for the selection of $\Delta\gamma$ is $0.1\gamma_1 \leq \Delta\gamma \leq 0.2\gamma_1$.

In Step 210, for each $C_i$, where $1 \leq i \leq K$, if $\alpha_i \geq \gamma_1 + \Delta\gamma$, then CPE $C_i$ is included in the set $\chi_{pre}$, i.e., $\chi_{pre} = \chi_{pre} \cup \{C_i\}$. Let L denote the number of CPEs with a path loss that satisfies the above condition.

In step 220, CPE $C_i$ with the smallest $\alpha_i$ is selected to be one of the two CPEs to share a communication channel. If more than one CPE has the same smallest path loss, a predetermined tie-breaker rule is employed to select only one. For example, the first of the CPEs that have the smallest path loss is selected.

In step 230, for each $C_j$ in the $\chi_{pre}$, where $1 \leq j \leq L$ and $i \neq j$, the correlation $s_i^j$ between CPE $C_i$ and CPE $C_j$ is calculated according to the following equation:

$$s_i^j = |h_i^H h_j| = \left| \sum_{m=1}^{M} h_{i,m}^* h_{j,m} \right|. \quad (\ldots)^H$$

denotes a Hermitian operator. CPE $C_j$ that has the smallest correlation with CPE $C_i$ is identified to be a potential partner.

In step 240, for CPEs $C_i$ and $C_j$, a value based on spatial signatures and path loss is calculated according to the following equation: $\alpha_i(1-|h_i^H h_j|^2)$.

In step 250, if $\alpha_i(1-|h_i^H h_j|^2) \geq \gamma_1$, then CPE $C_j$ is the other CPE that is to share a communication channel. A pair of CPEs ($C_i$, $C_j$) is identified to share a communication channel and then CPEs $C_i$ and $C_j$ are removed from the set $\chi_{pre}$.

If $\alpha_i(1-|h_i^H h_j|^2) < \gamma_1$, CPE $C_1$ cannot be the one to share a communication channel with CPE $C_j$. CPE $C_j$ is then removed from the set $\chi_{pre}$. If more than one CPE remains in the set $\chi_{pre}$, the selection process is repeated from step 220.

The process continues until no two CPEs could share a communication channel. All pairs of CPEs that could share a communication channel in SDMA are identified.

The above illustration provides many different embodiments or embodiments for implementing different features of the subject matter described herein. Specific embodiments of components and processes are described to help clarify the subject matter described herein. These are, of course, merely embodiments and are not intended to limit the subject matter described herein.

Although the invention is illustrated and described herein as embodied in one or more specific examples, it is nevertheless not intended to be limited to the details shown, since various modifications and structural changes may be made therein without departing from the spirit of the subject matter described herein and within the scope and range of equivalents of the claims. Accordingly, it is appropriate that the appended claims be construed broadly and in a manner consistent with the scope of the invention, as set forth in the following claims.

What is claimed is:

1. A method comprising:

at a base transceiver station (BTS) that operates in a wireless communications network and serves a plurality of customer premises equipments (CPEs), receiving signals at a plurality of antennas of the BTS from each of the plurality of CPEs and determining a spatial signature for each CPE based on signals received from the corresponding CPE;

calculating a correlation between spatial signatures of every two CPEs in the plurality of CPEs and designating two CPEs as channel-sharing candidates if the correlation between their spatial signatures is lower than a predetermined threshold;

creating a first set of CPEs of all the channel-sharing candidates;

counting a number of channel-sharing candidates for every CPE;

selecting a first CPE that has the fewest number of channel-sharing candidates;

creating a second set of CPEs by identifying all the channel-sharing candidates of the first CPE;

selecting a second CPE in the second set of CPEs that has the fewest number of channel-sharing candidates; and selecting the first and second CPEs to share a channel.

2. The method of claim 1, wherein the channel is a multiple access channel selected from the group consisting of frequency division multiple access, time division multiple access, code division multiple access and any combination of the above.

3. The method of claim 1, wherein the first predetermined threshold has a value between 0 and 1.

4. The method of claim 1, wherein selecting the first CPE comprises executing a predetermined tie-breaker rule when more than one CPE has the same fewest number of channel-sharing candidates.

5. The method of claim 4, wherein selecting the first CPE according to the predetermined tie-breaker rule comprises selecting a first of the CPEs in the first set having the fewest number of channel-sharing candidates.

6. The method of claim 1, wherein selecting the second CPE comprises executing a predetermined tie-breaker rule when more than one CPE has the same fewest number of channel-sharing candidates.

7. The method of claim 6, wherein selecting the second CPE according to the predetermined tie-breaker rule comprises selecting a first of the CPEs in the second set having the fewest number of channel-sharing candidates.

8. A method comprising:

at a base transceiver station (BTS) that operates in a wireless communications network and serves a plurality of customer premises equipments (CPEs), receiving signals at a plurality of antennas of the BTS from each of the plurality of CPEs and determining a spatial signature for each CPE and a path loss for each CPE based on signals received from the corresponding CPE;

creating a first set of channel-sharing candidates of CPEs based on path loss of the CPEs;

selecting a first CPE from the first set of channel-sharing candidates of CPEs that has a smallest path loss;

calculating a correlation between the spatial signatures of the first CPE and each of the CPEs in the first set of channel-sharing candidates;

selecting a second CPE from the first set of channel-sharing candidates whose spatial signature and that of the first CPE are least correlated; and selecting the first CPE and the second CPE to share a channel depending the spatial signatures and path loss of the first and the second CPEs, respectively.

9. The method of claim 8, wherein the channel is a multiple access channel selected from the group consisting of frequency division multiple access, time division multiple access, code division multiple access and any combination of the above.

10. The method of claim 8, wherein creating the first set of channel-sharing candidates of CPEs comprises assigning a CPE to the first set when its path loss exceeds a sum of the first predetermined threshold and a second predetermined threshold.

11. The method of claim 10, wherein the second predetermined threshold is a margin of the first predetermined threshold.

12. The method of claim 11, wherein the second predetermined threshold has a value that is between one-tenth and two-tenths of the first predetermined threshold.

13. The method of claim 8, wherein selecting the first CPE comprises executing a predetermined tie-breaker rule when more than one CPE has the same smallest path loss.

14. The method of claim 13, wherein selecting the first CPE according to the predetermined tie-breaker rule comprises selecting a first of the CPEs in the first set having the smallest path loss.

15. The method of claim 8, and further comprising calculating a value based on the spatial signatures and path loss of the first and the second CPEs according to the following equation: $\alpha_i(1-|h_i^H h_j|^2)$, where $h_j$ is the spatial signature of CPE j, $h_i$ is the spatial signature of CPE i and $\alpha_i$ is the path loss of CPE i, and wherein selecting the first CPE and the second CPE to share the channel is based on the value.

16. The method of claim 1, and further comprising removing the first CPE and the second CPE from the first set of CPEs and when there is more than one CPE remaining the first set of CPEs, repeating with respect to CPEs remaining in the first set of CPEs, said counting, said selecting a first CPE, said creating a second set of CPEs, said selecting a second CPE and said selecting of first and second CPEs to share a channel.

17. The method of claim 15, and further comprising comparing the value derived from the computation $\alpha_i(1-|h_i^H h_j|^2)$ with the first threshold, and wherein selecting the first CPE and the second CPE to share the channel occurs when the value is greater than or equal to a first threshold.

18. The method of claim 17, wherein when the value derived from the computation $\alpha_i(1-|h_i^H h_j|^2)$ is determined to not exceed the first threshold, further comprising removing the second CPE, CPE j, from the first set of CPEs, and when there is more than one CPE remaining in the first set of CPEs, repeating with respect to CPEs remaining in the first set of CPEs, said selecting a first CPE, said calculating a correlation, said selecting a second CPE and said selecting of first and second CPEs to share a channel.

19. The method of claim 10, wherein the first predetermined threshold has a value between 0 and 1.

* * * * *